(12) United States Patent
Chakraborty et al.

(10) Patent No.: US 10,534,071 B2
(45) Date of Patent: Jan. 14, 2020

(54) USING DATA FROM A RADAR SENSOR FOR MACHINE LEARNING BASED PERCEPTION

(71) Applicant: Robert Bosch GmbH, Stuttgart (DE)

(72) Inventors: Bhavana Chakraborty, Novi, MI (US); Berenike Beck, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 249 days.

(21) Appl. No.: 15/792,190

(22) Filed: Oct. 24, 2017

(65) Prior Publication Data

US 2019/0120936 A1 Apr. 25, 2019

(51) Int. Cl.
*G01S 7/41* (2006.01)
*G01S 13/58* (2006.01)
(Continued)

(52) U.S. Cl.
CPC ............ *G01S 7/417* (2013.01); *G01S 13/584* (2013.01); *G01S 13/60* (2013.01); *G01S 13/89* (2013.01);
(Continued)

(58) Field of Classification Search
CPC ........... G01S 13/931; G01S 2013/9353; G01S 2013/9375; G01S 7/354; G01S 13/36;
(Continued)

(56) References Cited

U.S. PATENT DOCUMENTS 6,822,606 B2   11/2004   Ponsford et al.
8,102,309 B2 *  1/2012   Nakagawa ................ G01S 3/74
                                           342/147

(Continued)

FOREIGN PATENT DOCUMENTS

DE        4243527 A1    1/1996
DE   102015211490 A1   12/2016
(Continued)

OTHER PUBLICATIONS

Welch P D: "The use of fast fourier transform for the estimation of power spectra: a method based on time averaging over short, modified periodograms", IEEE Transactions on Audio and Electroacoustics, IEEE Inc. New York, US, vol. AU-15, No. 2, Jun. 1, 1967 (Jun. 1, 1967), pp. 70-73.

(Continued)

*Primary Examiner* — Olumide Ajibade Akonai
(74) *Attorney, Agent, or Firm* — Michael Best & Friedrich LLP

(57) ABSTRACT

A system for providing a range speed response pattern to a learning system as an image. The system includes a radar sensor and an electronic controller. In one example, the electronic controller is configured to receive a radar signal, obtain a beat signal, apply a fast Fourier transform to the beat signal to generate a transform, apply a power spectral density periodogram to the beat signal to generate an estimate, and filter the transform with the estimate to generate a filtered transform. The electronic controller is further configured to store the filtered transform in a column of a matrix, apply the power spectral density periodogram to each row of the matrix, generate a range speed response pattern from the matrix, generate a signal to control the vehicle's motion based on the range speed response pattern, and control a steering apparatus, an engine, and/or a braking system of the vehicle.

15 Claims, 9 Drawing Sheets

(51) Int. Cl.
    *G01S 13/60* (2006.01)
    *G01S 13/93* (2006.01)
    *G01S 13/89* (2006.01)
(52) U.S. Cl.
    CPC ..... *G01S 13/931* (2013.01); *G01S 2013/9342* (2013.01); *G01S 2013/9346* (2013.01); *G01S 2013/9353* (2013.01)
(58) Field of Classification Search
    CPC ............. G01S 13/584; G01S 2007/356; G01S 2013/9346; G01S 13/06; G01S 13/93; G01S 7/417
    See application file for complete search history.

(56) References Cited

U.S. PATENT DOCUMENTS

| | | | |
|---|---|---|---|
| 8,779,969 B2* | 7/2014 | Shimizu | G01S 7/412 342/106 |
| 8,847,815 B2 | 9/2014 | Kanamoto | |
| 9,085,236 B2* | 7/2015 | Schwindt | B60K 31/0008 |
| 9,435,882 B2 | 9/2016 | Martone et al. | |
| 9,470,777 B2 | 10/2016 | Arage | |
| 9,575,168 B2* | 2/2017 | Aizawa | G01S 13/42 |
| 9,594,159 B2 | 3/2017 | Wang et al. | |
| 2003/0189512 A1 | 10/2003 | Chen et al. | |
| 2010/0271254 A1* | 10/2010 | Kanamoto | G01S 3/74 342/27 |
| 2015/0019116 A1* | 1/2015 | Koshizen | G08G 1/163 701/117 |
| 2015/0204971 A1* | 7/2015 | Yoshimura | G01S 13/345 342/70 |
| 2016/0018511 A1 | 1/2016 | Nayyar et al. | |
| 2016/0091603 A1* | 3/2016 | Aoki | G01S 13/931 342/70 |
| 2017/0131385 A1* | 5/2017 | Kurono | G01S 7/352 |
| 2018/0017672 A1* | 1/2018 | Warke | G01S 7/4021 |
| 2019/0011547 A1* | 1/2019 | Han | G01S 13/20 |

FOREIGN PATENT DOCUMENTS

| | | |
|---|---|---|
| EP | 3015880 A1 | 5/2016 |
| WO | 9518979 A1 | 7/1995 |
| WO | 9701106 A1 | 1/1997 |

OTHER PUBLICATIONS

Hansa Ran! Gupta, Rajesh Mehra, Sushila Batan: "Power Spectrum Estimation using Welch Method for various Window Techniques", International Journal of Scientific Research Engineering & Technology (IJSRET), vol. 2, No. 6, Sep. 2013 (Sep. 2013), pp. 389-392.
International Search Report for Application No. PCT/EP2018/078862 dated Jan. 30, 2019 (5 pages).

* cited by examiner

USING DATA FROM A RADAR SENSOR FOR MACHINE LEARNING BASED PERCEPTION

BACKGROUND

Embodiments relate to using data from radar sensors to detect the surrounding environment of a vehicle.

Advanced driver assistance systems (ADAS) are progressively adding new functionality with the goal of attaining full autonomy in vehicles. Traffic jam assist, lane centering support, and automatic emergency braking (AEB) are some examples of autonomous vehicle control systems.

SUMMARY

Environment detection or sensing of the environment surrounding a vehicle as well as obstacle detection and tracking are becoming more important in autonomous vehicle control systems. In some cases, information from several sensors is provided to a learning system to detect the environment surrounding a vehicle. Radar sensors are often used to provide information to the learning system because environmental conditions, such as rain and fog, have less effect on radar sensing than they have on camera-based sensing.

Embodiments herein provide, among other things, a method of providing data from radar sensors as an input to a learning system. In one example, the method generates a modified range-speed response pattern for a fast chirp radar signal. The method applies a fast Fourier transform to each beat signal of a radar signal. One embodiment described herein filters the resulting transforms with estimates created by applying a power spectral density periodogram to each beat signal, and stores the resulting filtered transforms in the columns of a matrix. Instead of applying a fast Fourier transform to each row of the matrix, as often done in the prior art, the method described herein applies a power spectral density periodogram to each row of the matrix. Filtering the transforms with the power spectral density periodogram and applying the power spectral density periodogram to each row of the matrix reduces noise in the range-speed response pattern provided to the learning system in the form of an image. Reducing noise in the range-speed response pattern allows an ADAS to detect and react to objects in a vehicle's surrounding environment at a faster speed and with a higher accuracy.

One embodiment provides a system for providing a range speed response pattern to a learning system as an image. The system includes a radar sensor, and an electronic controller. The electronic controller is configured to receive a radar signal from the radar sensor and obtain a beat signal of the radar signal. The electronic controller is also configured to apply a fast Fourier transform to the beat signal to generate a transform, apply a power spectral density periodogram to the beat signal to generate an estimate, and filter the transform with the estimate to generate a filtered transform. The electronic controller is further configured to store the filtered transform in a column of a matrix and apply the power spectral density periodogram to each row of the matrix. The electronic controller is configured to generate a range speed response pattern from the matrix, generate a signal to control the motion of a vehicle based the range speed response pattern, and control at least one selected from a group of a steering apparatus, an engine, and a braking system of the vehicle.

Another embodiment provides a method for providing a range speed response pattern to a learning system as an image. The method includes receiving, from a radar sensor, a radar signal and obtaining a beat signal of the radar signal. The method also includes applying, with an electronic controller, a fast Fourier transform to the beat signal to generate a transform, applying, with the electronic controller, a power spectral density periodogram to the beat signal to generate an estimate, and filtering the transform with the estimate to generate a filtered transform. The method further includes storing the filtered transform in a column of a matrix stored in a memory of the electronic controller, applying, with the electronic controller, the power spectral density periodogram to each row of the matrix, and generating a range speed response pattern from the matrix. The method includes generating, with the electronic controller, a signal to control the motion of a vehicle based the range speed response pattern and controlling, with the electronic controller or another electronic controller, at least one selected from a group of a steering apparatus, an engine, and a braking system of the vehicle.

Another embodiment provides a system for providing a range speed response pattern to a learning system as an image. The system includes a radar sensor and an electronic controller configured to receive, from the radar sensor, a radar signal, obtain a beat signal of the radar signal, apply a time to frequency domain transform to the beat signal to generate a transform, apply a power spectral density periodogram to the beat signal to generate an estimate, filter the transform with the estimate to generate a filtered transform, apply the power spectral density periodogram to the filtered transform to create a second estimate, generate the range speed response pattern from the second estimate, generate a signal to control the motion of a vehicle based on the range speed response pattern, and control at least one selected from a group of a steering apparatus, an engine, and a braking system of the vehicle.

Other aspects will become apparent by consideration of the detailed description and accompanying drawings.

DETAILED DESCRIPTION

Before any embodiments are explained in detail, it is to be understood that embodiments are not limited in their application to the details of construction and the arrangement of components set forth in the following description or illustrated in the following drawings. Other embodiments are possible and capable of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of embodiments may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
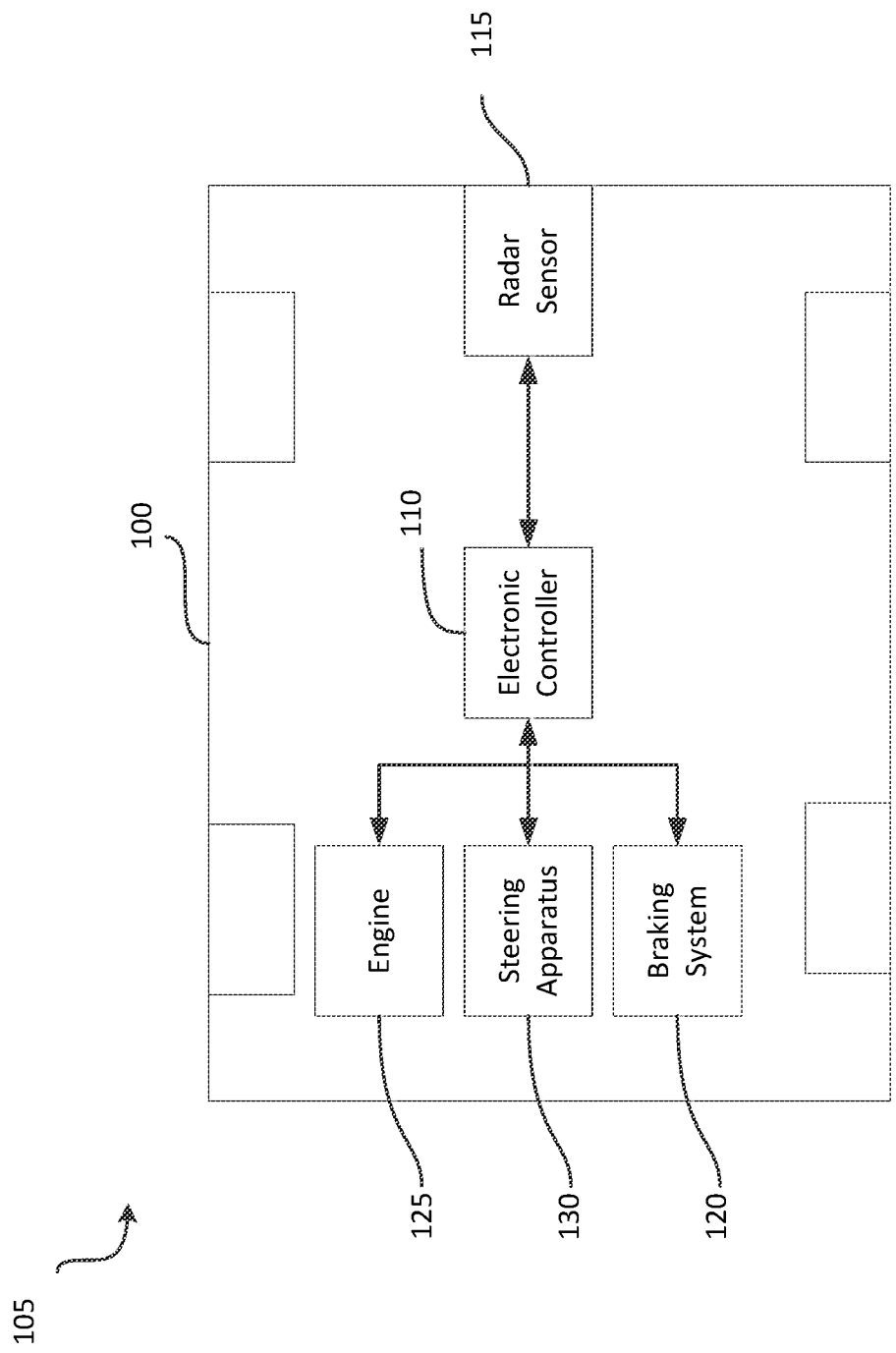
FIG. 1 is a block diagram of a vehicle with a system for detecting the vehicle's surrounding environment using a radar sensor.

FIG. 1 illustrates a vehicle 100 with a system 105 for providing a range speed response pattern to a learning system as an image. The vehicle 100, although illustrated as a four-wheeled vehicle, may encompass various types and designs of vehicles. For example, the vehicle 100 may be an automobile, a motorcycle, a truck, a bus, a semi-tractor, and others. The vehicle 100 includes at least some autonomous functionality, but may also require a driver or operator to perform driving functions. In the example illustrated, the system 105 includes several hardware components including an electronic controller 110, a radar sensor 115, a braking system 120, an engine 125, and a steering apparatus 130. The components of the system 105 may be of various constructions and may use various communication types and protocols.

The electronic controller 110 may be communicatively connected to the radar sensor 115, braking system 120, engine 125, and steering apparatus 130 via various wired or wireless connections. For example, in some embodiments, the electronic controller 110 is directly coupled via a dedicated wire to each of the above-listed components of the system 105 for providing a range speed response pattern to a learning system as an image. In other embodiments, the electronic controller 110 is communicatively coupled to one or more of the components via a shared communication link such as a vehicle communication bus (for example, a controller area network (CAN) bus) or a wireless connection.

The input from the radar sensor 115 is used by the electronic controller 110 to detect objects in the vehicle's surrounding environment. Specifically, the radar sensor 115 detects objects within an area defined by a radial distance, for example a radial distance of 250 meters, from the vehicle 100. Although illustrated as a single sensor, the radar sensor 115 may be a plurality of radar sensors placed on or within the vehicle 100 at various positions. For example, in addition to the radar sensor 115 placed at the front of the vehicle 100 another radar sensor may be placed in each of the tail lights of the vehicle 100. The vehicle 100 can also use input from additional sensors, such as a lidar sensor or a video camera, in combination with input from the radar sensor 115 to detect the vehicle's surrounding environment.

Figure 2:
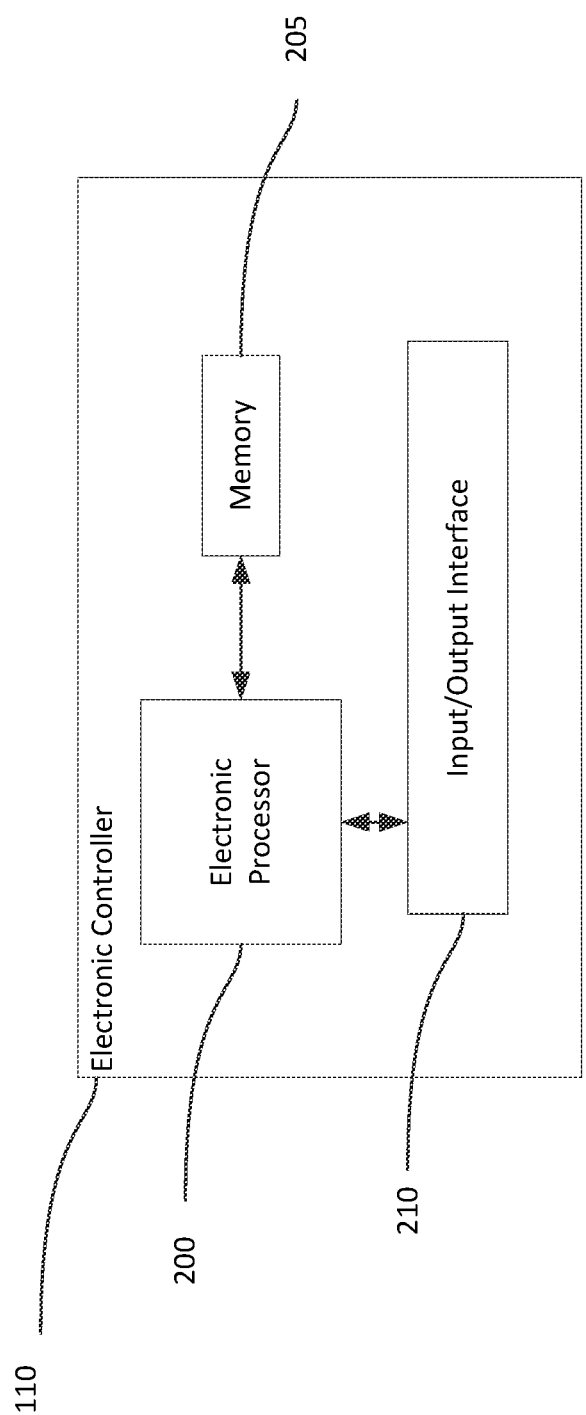
FIG. 2 is a block diagram of the electronic controller of the system of FIG. 1.

FIG. 2 is a block diagram of the electronic controller 110 of the system 105 of FIG. 1. The electronic controller 110 includes a plurality of electrical and electronic components that provide power, operation control, and protection to the components and modules within the electronic controller 110. The electronic controller 110 includes, among other things, an electronic processor 200 (such as a programmable electronic microprocessor, microcontroller, or similar device), a memory 205 (for example, non-transitory, machine readable memory), and an input/output interface 210. The electronic processor 200 is communicatively connected to the memory 205 and the input/output interface 210. The electronic processor 200, in coordination with the memory 205 and the input/output interface 210, is configured to implement, among other things, the methods described herein.

The electronic controller 110 may be implemented in several independent controllers (for example, programmable electronic control units) each configured to perform specific functions or sub-functions. Additionally, the electronic controller 110 may contain sub-modules that include additional electronic processors, memory, or application specific integrated circuits (ASICs) for handling input/output functions, processing of signals, and application of the methods listed below. In other embodiments, the electronic controller 110 includes additional, fewer, or different components.

Figure 3:
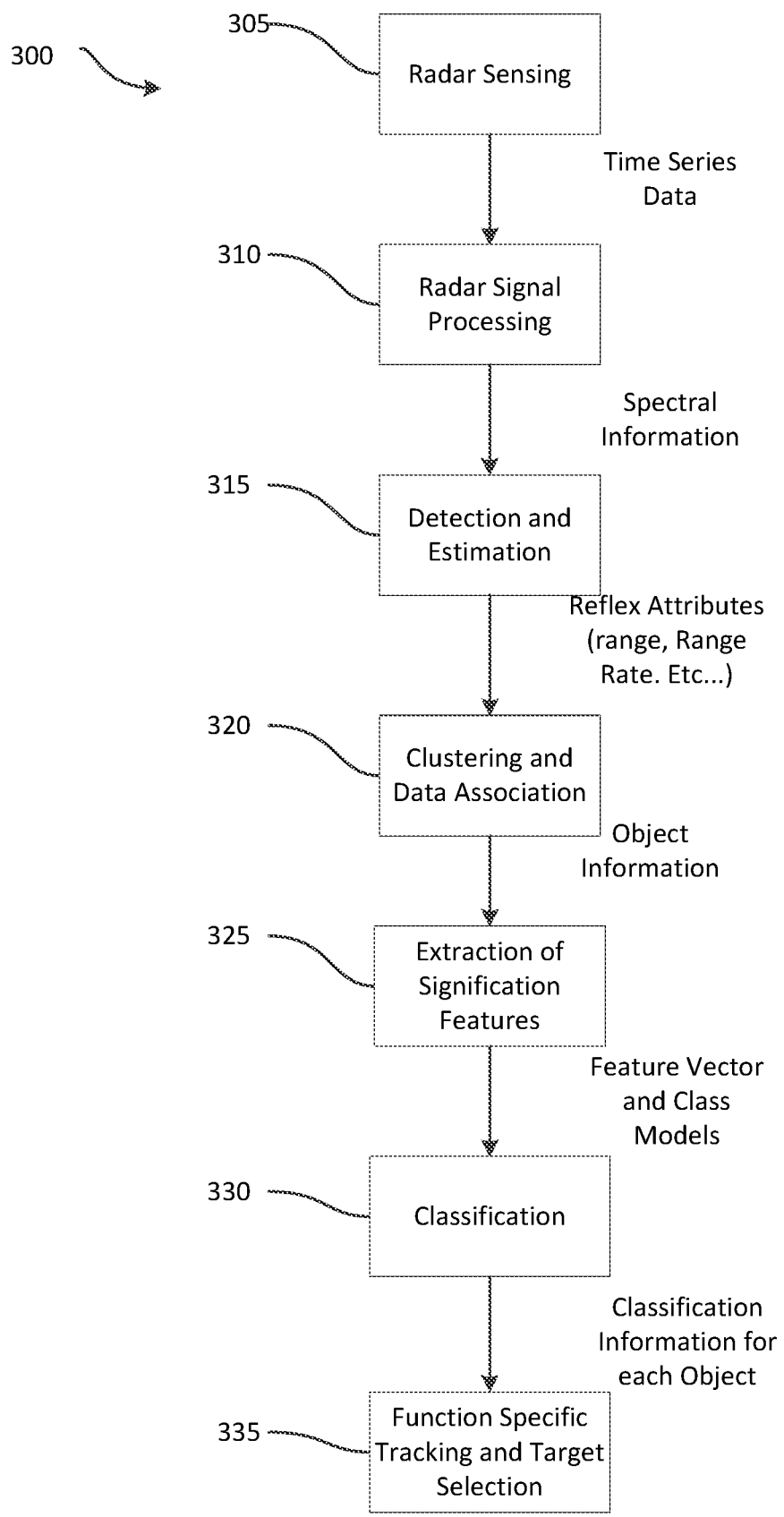
FIG. 3 is a flow chart of a method for using data from a radar sensor to detect a vehicle's surrounding environment.

FIG. 3 illustrates a method 300 for detecting a vehicle's surrounding environment using data from a radar sensor. In the example illustrated, a spectral estimation is created from a radar signal (block 310). Information, such as a range and a speed of each object in the vehicle's surrounding environment, is extracted from the spectral estimation (block 315). The information is clustered (block 320) and feature vectors are determined from the clusters (block 325). Classification information for different objects is determined based on the feature vectors (block 330).

Figure 4:
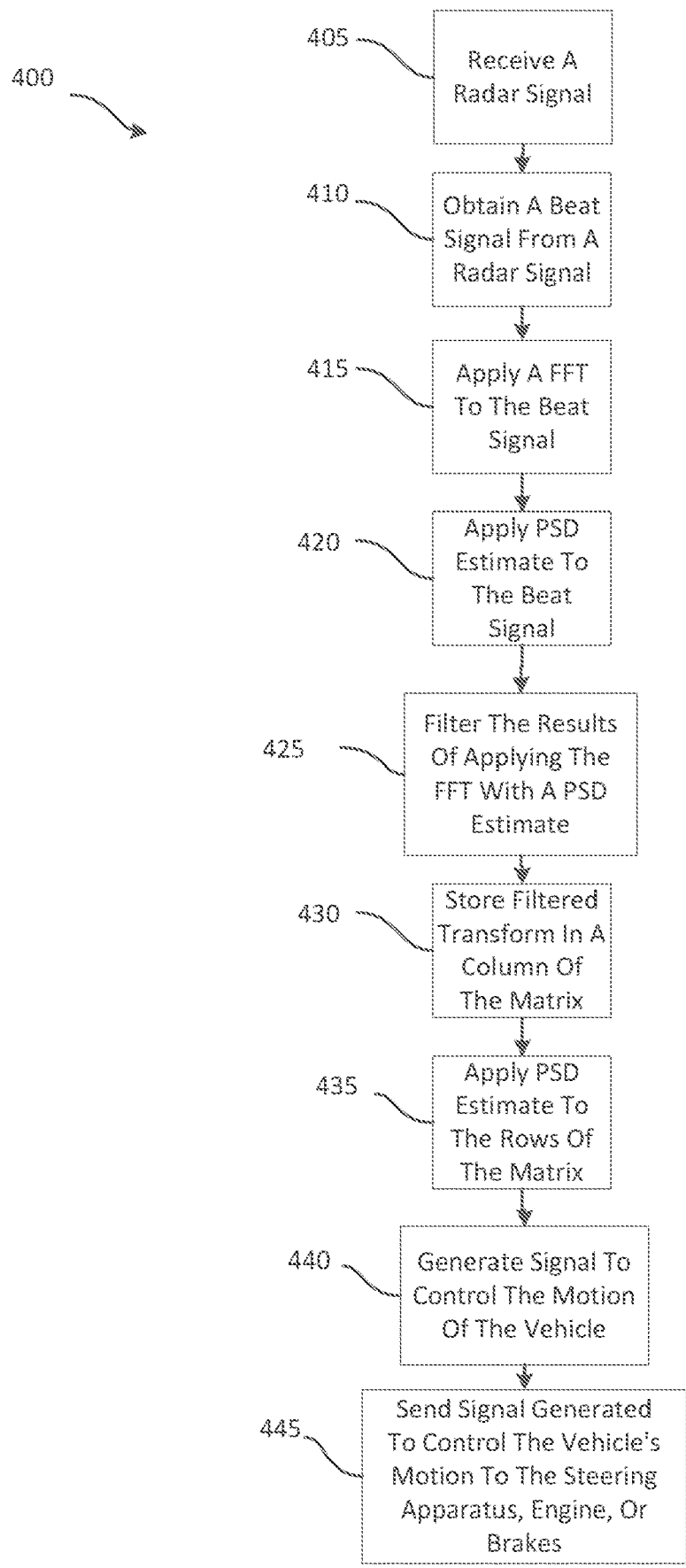
FIG. 4 is a flow chart of a method for creating a range speed response pattern for a radar signal.

FIG. 4 illustrates a method 400 for providing a range speed response pattern to a learning system as an image. The electronic controller 110 receives a radar signal from the radar sensor 115 (block 405) and through frequency down conversion and filtering obtains a digital beat signal for a radar signal (block 410). A fast Fourier transform, or a time to frequency domain transform, is applied to the digital beat signal producing a transform (block 415). The power spectral density periodogram is applied to the beat signal, producing an estimate (block 420). In one example, a Welch periodogram is used with the Hanning window to determine the estimate for the beat signal. The transform is filtered using the estimate (block 425). The filtered transform is stored in the columns of a matrix (block 430). The power spectral density periodogram is applied to the rows of the matrix (block 435), producing a second estimate. The resulting matrix creates the range speed response pattern. Based on the range speed response pattern the electronic controller 110 generates a signal to control the motion of the vehicle 100 (block 440). The electronic controller 110 sends the signal, generated to control the motion of the vehicle 100, to the engine 125, the steering apparatus 130, the braking system 120, or a combination of the same (block 445).

Figure 5:
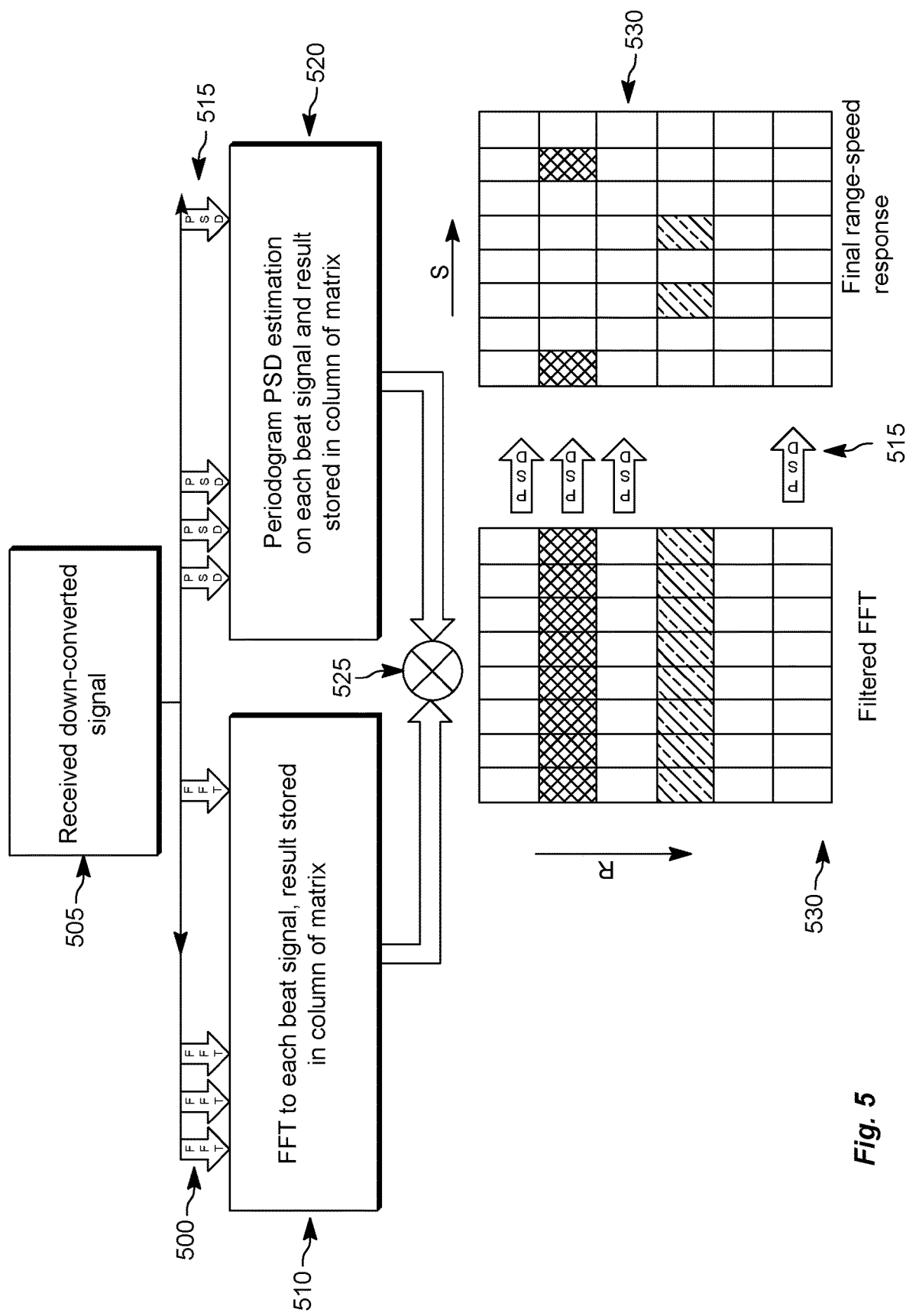
FIG. 5 is a graphical representation of data flow and processing logic for creating a range speed response pattern for a radar signal.

FIG. 5 is a graphical representation of the data flow and processing logic for providing a range speed response pattern to a learning system as an image. The fast Fourier transform 500 is applied to a beat signal 505, creating a transform 510. The power spectral density periodogram 515 is applied to the beat signal 505 creating an estimate 520. The transform 510 is filtered by the estimate 520 and a filtered transform 525 is stored in the columns of a matrix 530. The power spectral density periodogram 515 is applied to the rows of the matrix 530.

Figure 6:
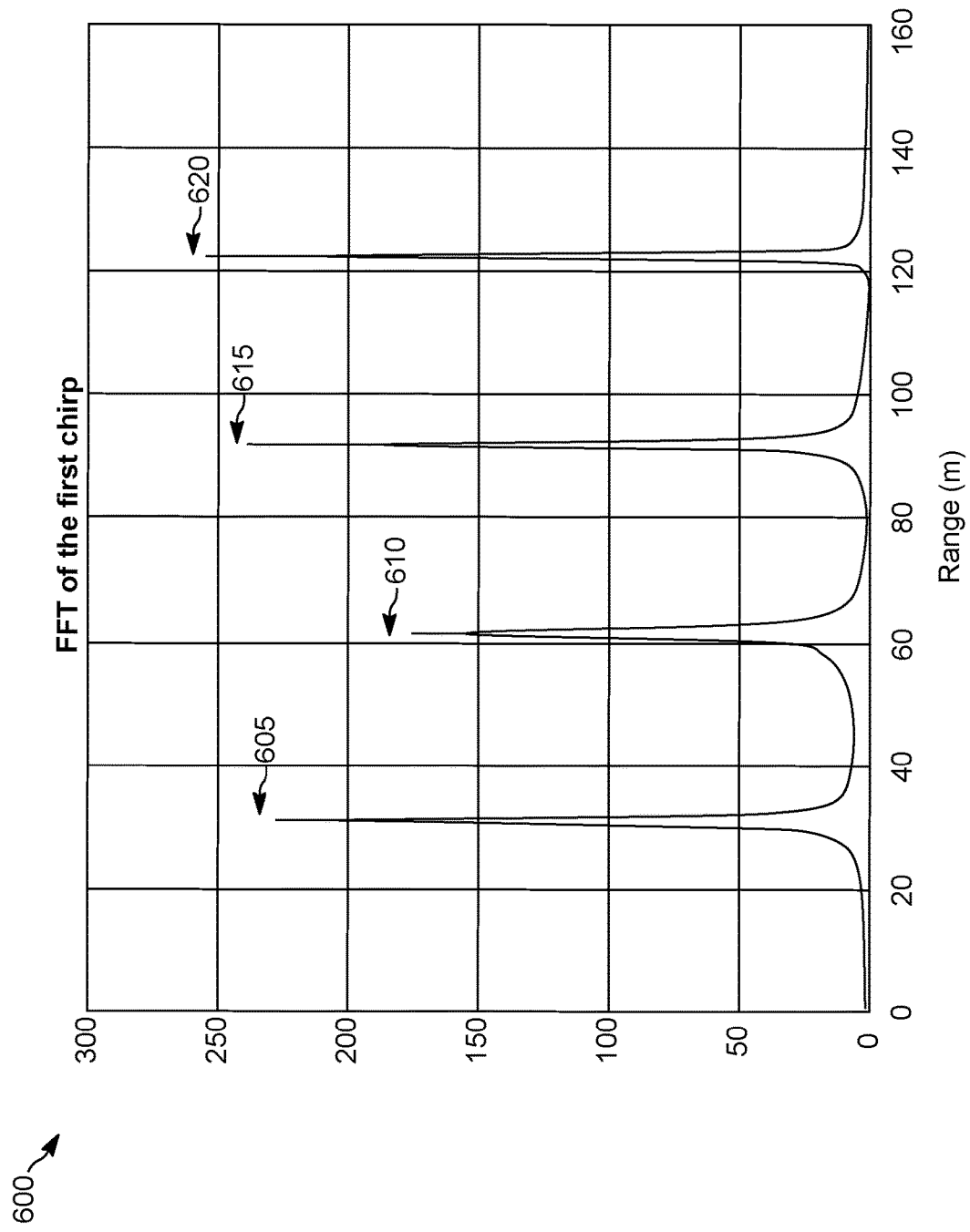
FIG. 6 is a graph of a transform resulting from the application of the fast Fourier transform to a digital beat signal of a radar signal.

FIG. 6 illustrates a graph 600 of a transform resulting from the application of the fast Fourier transform to a digital beat signal of a radar signal without noise. Each peak in the graph 600 represents an object in the vehicle's surrounding environment. The positions of the peaks along the x axis indicate the range of each object, or the distance from the vehicle 100 to each object within an area defined by a radial distance, for example a radial distance of 250 meters, from the vehicle 100. The heights of the peaks in the y axis indicate a magnitude of frequency. For example, the graph 600 shows that there are four objects in the vehicle's surrounding environment. Peak 605 indicates there is an object about 30 meters from the vehicle 100. Peak 610 indicates there is an object about 60 meters from the vehicle 100. Peak 615 indicates there is an object about 90 meters from the vehicle 100. Peak 620 indicates there is an object about 120 meters from the vehicle 100.

Figure 7A:
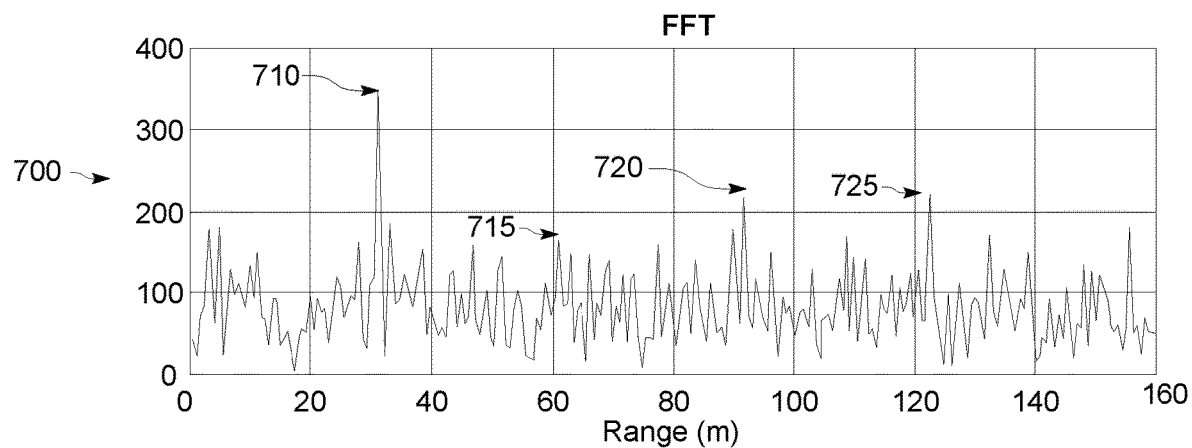
FIG. 7A is a graph of a transform resulting from the application of the fast Fourier transform to a digital beat signal of a radar signal with noise.
Figure 7B:
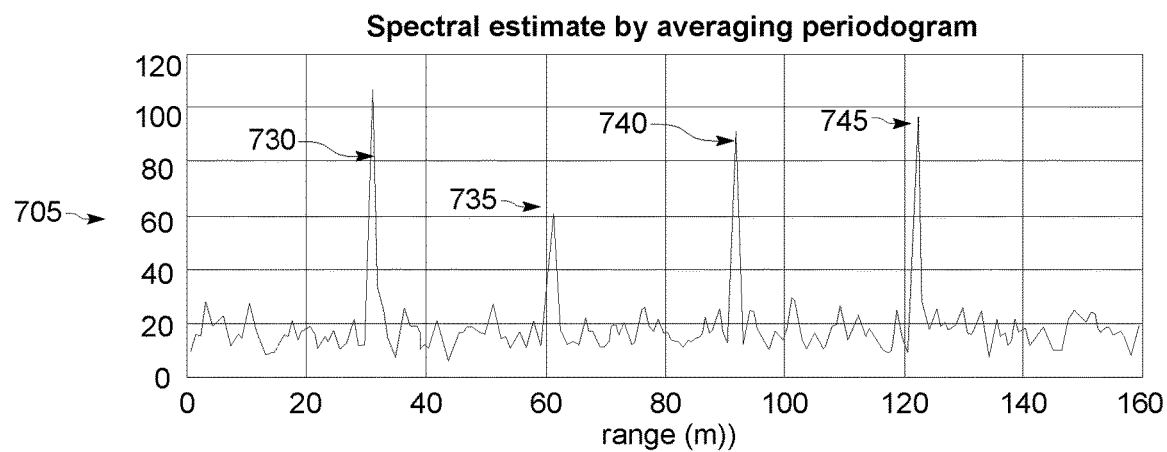
FIG. 7B is a graph of the estimate resulting from the application of the power spectral density periodogram to a digital beat signal of a radar signal with noise.

FIG. 7A illustrates a graph 700 of a transform resulting from the application of the fast Fourier transform to a digital beat signal of a radar signal with noise. FIG. 7B illustrates a graph 705 of an estimate resulting from the application of a power spectral density periodogram to a digital beat signal of a radar signal with noise. The graph 700 and the graph 705 should both show that there are objects located a distance of 30 meters from the vehicle 100, 60 meters from the vehicle 100, 90 meters from the vehicle 100, and 120 meters from the vehicle 100. Peaks 710, 715, 720, and 725 of graph 700 indicate there are objects 30, 60, 90, and 120 meters from the vehicle 100. The peaks 710, 715, 720, and 725 of graph 700 are difficult to distinguish from the peaks that do not indicate objects and are caused by white noise. Peaks 730, 735, 740, and 745 of graph 705 are distinct and clearly indicate that there are objects 30, 60, 90, and 120 meters from the vehicle 100.

Figure 8:
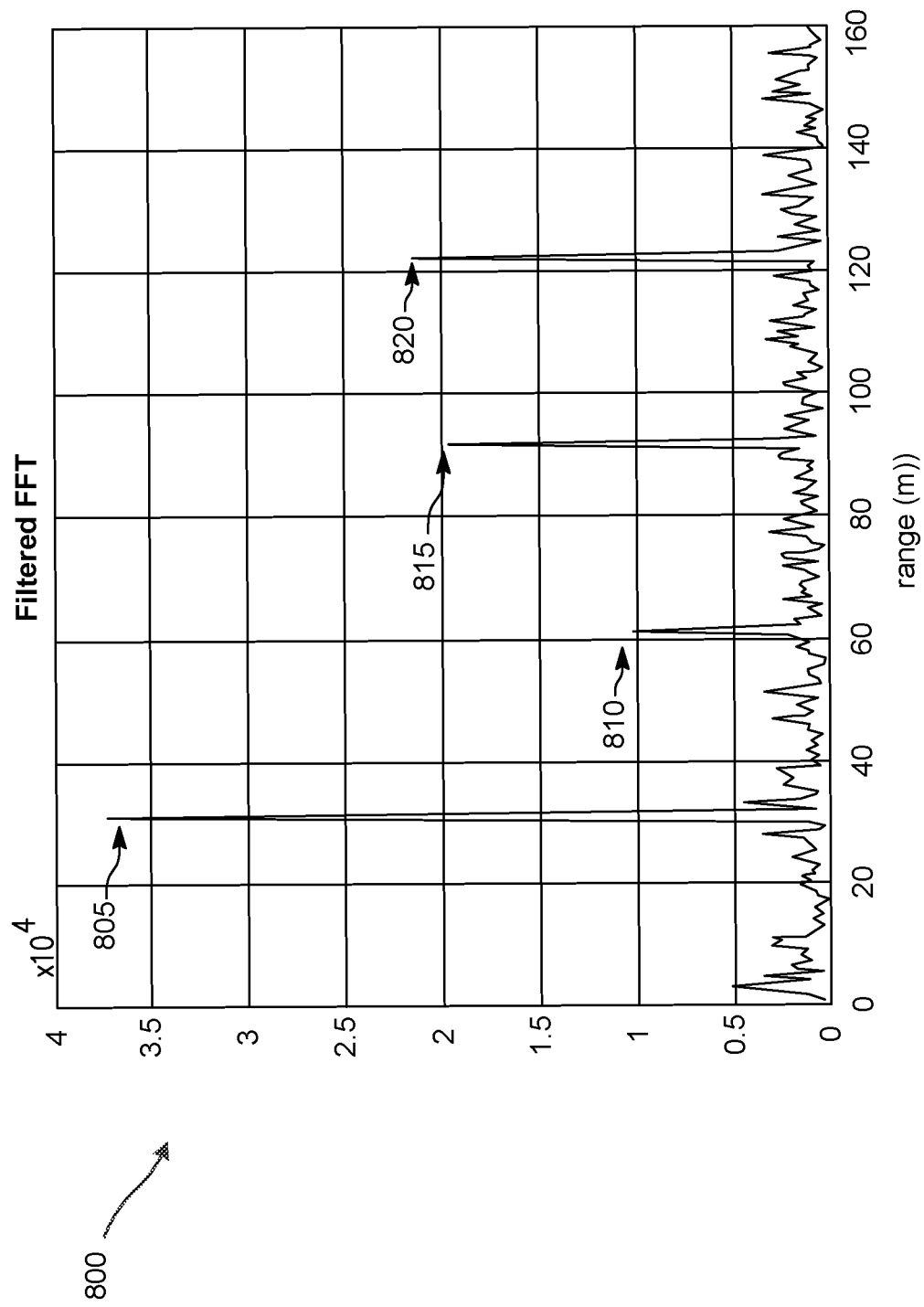
FIG. 8 is a graph of a filtered transform generated by filtering the transform of FIG. 7A with the estimate of FIG. 7B.

FIG. 8 illustrates a graph 800 of a filtered transform that results from filtering the transform of FIG. 7A with the estimate of FIG. 7B. The peaks 805, 810, 815, and 820 are distinct and indicate that there are objects 30, 60, 90, and 120 meters from the vehicle 100.

Figure 9:
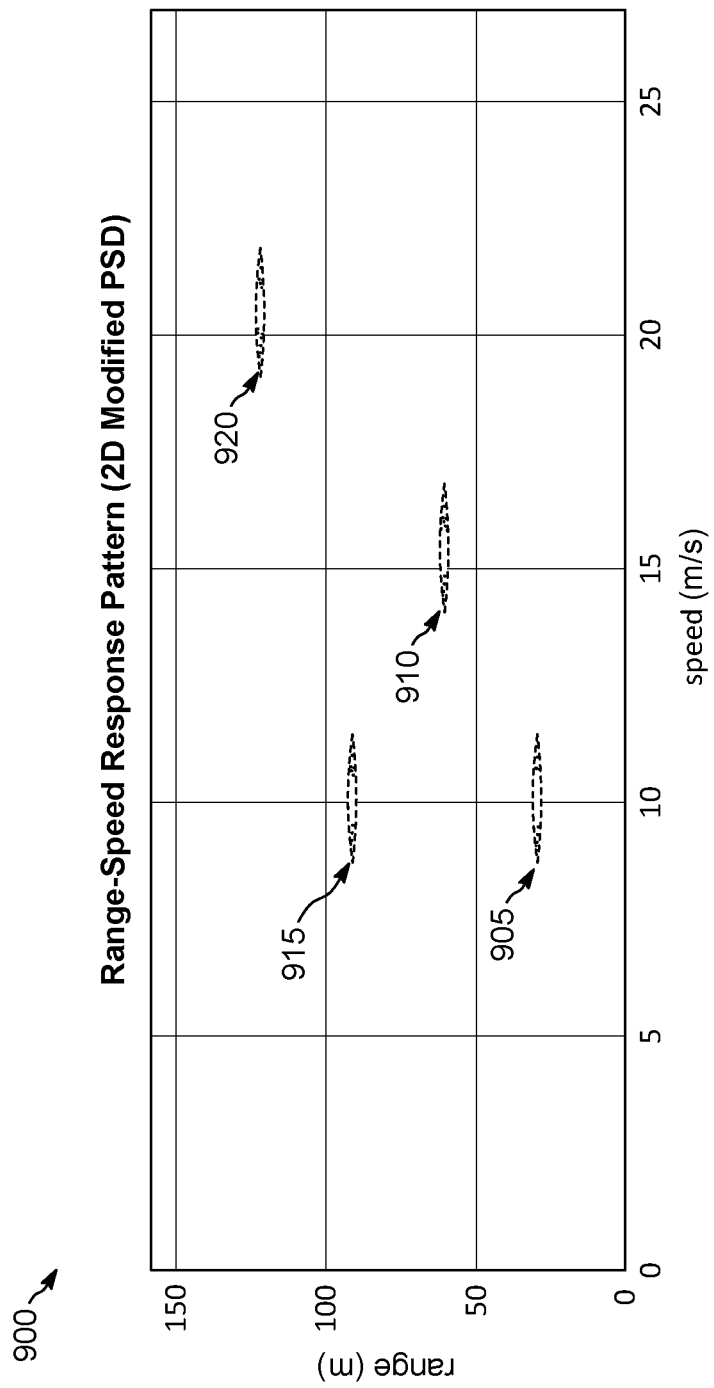
FIG. 9 is an illustration of a range-speed response pattern produced by the method of FIG. 4.

FIG. 9 shows an example of a range speed response pattern 900 that is generated from the matrix 530. The matrix 530 used to generate the range speed response pattern 900 has had the filtered transform 525 stored in its columns and power spectral density periodogram 535 applied to its rows. Each of the light markings in the range speed response pattern 900 represents an object. Marking 905 represents an object that is 30 meters from the vehicle 100 and is moving at a speed of 10 meters per second relative to the vehicle 100. Marking 910 represents an object that is 60 meters from the vehicle 100 and is moving at a speed of 15 meters per second relative to the vehicle 100. Marking 915 represents an object that is 90 meters from the vehicle 100 and is moving at a speed of 10 meters per second relative to the vehicle 100. Marking 920 represents an object that is 120 meters from the vehicle 100 and is moving at a speed of 20 meters per second relative to the vehicle 100.

Range speed response patterns representing a wide variety of environmental conditions and driving situations are used to train a learning system stored in the memory of the electronic controller 110. The learning system is used to detect the environment surrounding the vehicle 100.

Thus, the embodiments provide, among other things, a method for providing a range speed response pattern to a learning system as an image. Various features and advantages are set forth in the following claims.

What is claimed is:

1. A system for providing a range speed response pattern to a learning system as an image, the system comprising;
   a radar sensor; and
   an electronic controller configured to,
   receive, from the radar sensor, a radar signal,
   obtain a beat signal of the radar signal,
   apply a fast Fourier transform to the beat signal to generate a transform,
   apply a power spectral density periodogram to the beat signal to generate an estimate,
   filter the transform with the estimate to generate a filtered transform,
   store the filtered transform in a column of a matrix,
   apply the power spectral density periodogram to each row of the matrix,
   generate the range speed response pattern from the matrix,
   generate a signal to control the motion of a vehicle based on the range speed response pattern, and
   control at least one selected from a group of a steering apparatus, an engine, and a braking system of the vehicle.

2. The system according to claim 1, wherein the filtered transform is generated for each beat signal of the radar signal.

3. The system according to claim 1, wherein the power spectral density periodogram used to generate the estimate is a Welch periodogram with a Hanning window.

4. The system according to claim 1, wherein the filtered transform indicates a distance between an object and the vehicle.

5. The system according to claim 1, wherein the learning system is trained with range speed response patterns representing a variety of situations and conditions to detect the vehicle's surrounding environment.

6. The system according to claim 1, wherein the beat signal is obtained through a frequency down conversion and filtering of the radar signal.

7. The system according to claim 1, wherein the range speed response pattern indicates a distance from the vehicle to each object in the vehicle's surrounding environment and a speed of each object in the vehicle's surrounding environment.

8. A method for providing a range speed response pattern to a learning system as an image, the method comprising;
   receiving, from a radar sensor, a radar signal;
   obtaining a beat signal of the radar signal;
   applying, with an electronic controller, a fast Fourier transform to the beat signal to generate a transform;
   applying, with the electronic controller, a power spectral density periodogram to the beat signal to generate an estimate;
   filtering the transform with the estimate to generate a filtered transform;
   storing the filtered transform in a column of a matrix, the matrix stored in a memory of the electronic controller;
   applying, with the electronic controller, the power spectral density periodogram to each row of the matrix;
   generating the range speed response pattern from the matrix;

generating, with the electronic controller, a signal to control the motion of a vehicle based on the range speed response pattern; and controlling, with the electronic controller or another electronic controller, at least one selected from a group of a steering apparatus, an engine, and a braking system of the vehicle.

9. The method according to claim 8, wherein the filtered transform is generated for each beat signal of the radar signal.

10. The method according to claim 8, wherein the power spectral density periodogram used to generate the estimate is a Welch periodogram with a Hanning window.

11. The method according to claim 8, wherein the filtered transform indicates a distance between each object in the vehicle's surrounding environment and the vehicle.

12. The method according to claim 8, wherein the learning system is trained with range speed response patterns representing a variety of situations and conditions to detect the vehicle's surrounding environment.

13. The method according to claim 8, wherein the beat signal is obtained through a frequency down conversion and filtering of the radar signal.

14. The method according to claim 8, wherein the range speed response pattern indicates a distance from the vehicle to each object in the vehicle's surrounding environment and a speed of each object in the vehicle's surrounding environment.

15. A system for providing a range speed response pattern to a learning system as an image, the system comprising;

a radar sensor; and an electronic controller configured to, receive, from the radar sensor, a radar signal, obtain a beat signal of the radar signal, apply a time to frequency domain transform to the beat signal to generate a transform, apply a power spectral density periodogram to the beat signal to generate an estimate, filter the transform with the estimate to generate a filtered transform, apply the power spectral density periodogram to the filtered transform to create a second estimate, generate the range speed response pattern from the second estimate, generate a signal to control the motion of a vehicle based on the range speed response pattern, and control at least one selected from a group of a steering apparatus, an engine, and a braking system of the vehicle.

* * * * *